United States Patent

Black et al.

Patent Number: 5,812,590
Date of Patent: Sep. 22, 1998

[54] FREQUENCY SPREADING CLOCK MODULATION

[75] Inventors: Gregory Redmond Black, Vernon Hills; Alexander Wayne Hietala, Cary; Mark Robert Burns, South Elgin, all of Ill.

[73] Assignee: Motorola, Inc., Schaumburg, Ill.

[21] Appl. No.: 608,451

[22] Filed: Feb. 28, 1996

[51] Int. Cl.[6] .................................................. H04R 15/00
[52] U.S. Cl. ................................ 375/200; 331/18; 331/25
[58] Field of Search ...................................... 375/200, 206, 375/376; 331/25, 18; 455/76, 86, 260, 317; 340/310.02, 310.03, 825.69

[56] References Cited

U.S. PATENT DOCUMENTS

| | | |
|---|---|---|
| 4,507,796 | 3/1985 | Stumfall . |
| 4,996,684 | 2/1991 | Morley et al. . |
| 5,241,562 | 8/1993 | Partyka et al. ........................ 375/200 |
| 5,263,055 | 11/1993 | Cahill . |
| 5,307,372 | 4/1994 | Sawyer et al. ........................ 375/200 |
| 5,430,392 | 7/1995 | Matejic . |
| 5,437,060 | 7/1995 | Delamater et al. . |
| 5,610,955 | 3/1997 | Bland ................................... 375/376 |

FOREIGN PATENT DOCUMENTS

| | | |
|---|---|---|
| 416423A2 | 3/1991 | European Pat. Off. . |
| 90/14710 | 11/1990 | WIPO . |
| 96/27943 | 9/1996 | WIPO . |

*Primary Examiner*—Stephen Chin
*Assistant Examiner*—Joseph Roundtree
*Attorney, Agent, or Firm*—Randall S. Vaas

[57] ABSTRACT

A communication device (104) comprises a receiver circuit (108) receiving a modulated receive signal. A reference oscillator (132) generates a first clock signal at a first frequency, the first clock signal having harmonics. Circuitry (130) coupled to the reference oscillator and to the receiver responds to the first clock signal to produce a signal used by the receiver to reduce the frequency of the modulating signal. A frequency spreading circuit (134) is also coupled to the reference oscillator to modulate the first clock signal with a frequency spreading signal to produce a modulated clock signal including modulated harmonic frequency components. The frequency spreading circuit selectively combines the frequency spreading signal and the first clock signal. A control circuit (114) controls the frequency spreading circuit to modulate first clock signal with the frequency spreading signal when the selected received signal includes a harmonic of the first clock signal.

15 Claims, 4 Drawing Sheets

FREQUENCY SPREADING CLOCK MODULATION

FIELD OF THE INVENTION

The present invention pertains to clock modulation, and more particularly to frequency spreading to reduce noise.

BACKGROUND OF THE INVENTION

A radio frequency (RF) communication system comprises devices that communicate over a shared communication link. Communication links in RF wireless communication systems are typically referred to as channels. The channel is defined by its center frequency and falls within a predetermined bandwidth. To transmit information, an information signal is modulated with a carrier signal having the center frequency of the channel.

In wireline systems, the communication link is defined by a twisted wire pair, a coaxial cable, or the like. Information signals are transmitted on the wireline link by a carrier signal having a particular frequency common to devices at different ends of the communication link.

In both wireline and wireless systems, a transmitter and a receiver are employed to communicate over the communication link. A transmitter includes a modulator and a receiver includes a demodulator. The modulator is used to modulate an information signal with a carrier signal for transmission over the communication link. The demodulator is used to demodulate signals received from the communication link by removing the carrier signal and outputting the information signal.

In addition to the demodulator, RF receivers typically employ filters to remove noise outside of a desired bandwidth and a detector to convert the demodulated signal into a signal usable by digital circuitry in the communication device. The digital circuitry is driven by a high frequency clock signal. This high frequency clock signal contains significant spectral energy which produces harmonic frequency components, hereinafter harmonics. These harmonics are at multiples of the frequency of the clock signal driving the digital circuitry.

Radiated energy at harmonics of the clock frequency can significantly interfere with the information signals within the frequencies passed by the receiver filters if the channel frequency and the harmonic signal are equal or very close to one another. If this energy is significant relative to the received signal, the radiated energy may mask the information signal, resulting in poor information reception. The degradation of the sensitivity of the detector in this manner resulting in poor information reception is known as desensitization, or desense.

One particularly advantageous circuit for overcoming desense employs a frequency spreading signal generator and a signal modulator. The modulator modulates the clock signal with a frequency spreading signal to produce a resultant signal. The power level of the harmonics of the resultant signal are spread over a frequency bandwidth greater than the bandwidth of the receive filters, such that desense due to harmonics can be reduced. Although this circuit significantly improves the performance of the receiver, it is desirable to provide additional improvements in the receiver.

DETAILED DESCRIPTION OF THE PREFERRED EMBODIMENTS

Figure 1:
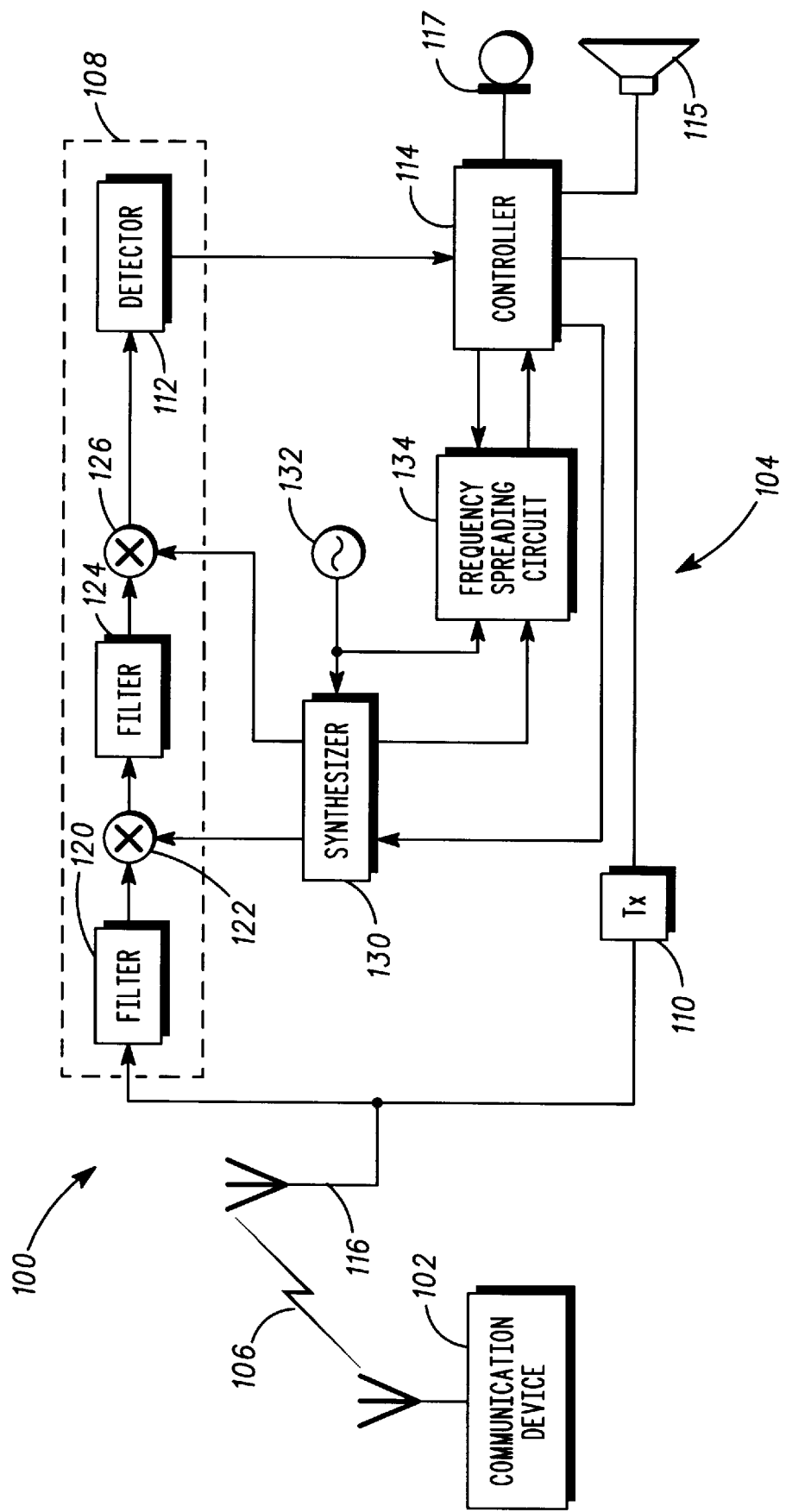
FIG. 1 is a circuit diagram illustrating a radiotelephone system.

A communication device comprises a receiver circuit receiving a modulated receive signal within a first bandwidth. A reference oscillator generates a first clock signal at a first frequency, the first clock signal having harmonics. A synthesizer circuit coupled to the reference signal generator and to the receiver is responsive to the first clock signal to demodulate the modulated receive signal. A frequency spreading circuit is also coupled to the reference oscillator to selectively modulate the first clock signal with a frequency spreading signal to produce a modulated clock signal having spread modulated harmonic frequency components. The frequency spreading circuit selectively combines the frequency spreading signal with the first clock signal to spread harmonics of the first clock signal over a frequency bandwidth greater than the first bandwidth. A control circuit is coupled to the frequency spreading circuit to receive the modulated clock signal and operates at the frequency of the modulated clock signal. The circuit thus selectively generates a modulated clock signal such that the harmonic frequency signals are not spread into multiple channels when the master clock signal harmonics are not in the presently selected receiver channel.

A radiotelephone system 100 (FIG. 1) includes communication devices 102 and 104 that communicate over a communication link 106. The communication devices can be any two or more compatible devices such as MODEMs (a device having both a modulator and a demodulator), telephones, a cordless or a cellular radiotelephone, two-way radios, a radio, a base station, a cordless telephone base, a radio dispatch center, a radio transmission station, or the like. As used herein, "communication device" refers to each of these and their equivalents. The illustrated communication devices 102 and 104 exchange information via a wireless communication link 106. However, the communication link 106 can be a twisted wire pair, a coaxial cable, a satellite link, or the like. Hence, "communication link" as used herein refers to each of these and their equivalents.

The illustrated remote device, a radiotelephone, includes a receiver circuit 108 including a detector 112, a transmitter 110, and a controller 114. The receiver receives modulated signals from the communication link 106 via antenna 116 and outputs signals having a stepped down frequency to detector 112. The detector 112 demodulates the stepped down signals to generate signals input to controller 114. The controller 114 can be implemented using a digital signal processor, a microprocessor such as the HC-11 available from Motorola, Inc., or the like, and associated commercially available known circuitry.

The controller 114 responds to audio signals received from detector 112 to generate analog signals which drive speaker 115. The controller 114 is responsive to audio signals from microphone 117 to output signals to transmitter 110. Transmitter 110 generates modulated signals from the signals output by controller 114 and the modulated signals are input to antenna 116 for communication over communication link 106.

The illustrated receiver circuit 108 is a double heterodyne receiver, but alternately could be any conventional receiver circuit. The illustrated receiver includes a filter 120, a mixer 122, a filter 124, a mixer 126 and detector 112. A synthesizer circuit 130 is coupled to the receiver circuit 108 to provide a channel select signal to mixer 122 and an oscillating signal to mixer 126.

A reference oscillator 132 is coupled to the synthesizer circuit 130 and to a frequency spreading circuit 134. The reference oscillator 132 generates a reference signal, or clock signal. The clock signal is input to the synthesizer circuit 130 as a reference signal and to the frequency spreading circuit 134 as a clock signal. The frequency spreading circuit 134 combines the clock signal with the frequency spreading signal to generate a modulated clock signal.

The operation of the communication device 104 will now be described with reference to the illustrated radiotelephone system 100. The communication link 106 in the RF wireless systems is defined by a predetermined frequency range including a plurality of different channels in which signals are communicated. This frequency range is passed by the wider bandwidth filter 120. For example, the up-link channels (from a base station to a mobile station) in the Global System for Mobil Communications (GSM) are all within the frequency band from 925 MHz to 960 MHz, and this frequency band is passed by filter 120. Signals outside of the pass band of filter 120 are noise to the receiver, and are attenuated by filter 120 to remove them from the signal input to detector 112.

The mixer 122 steps down the frequency of one of the channels passed by filter 120 to a particular intermediate frequency associated with filter 124. The bandwidth of filter 124 is narrower than filter 120, and is preferably equal to the bandwidth of one channel. Filter 124 thus passes only the one channel from filter 120 whose center frequency is the center frequency of filter 124. For example, the channels in the GSM system have center frequencies spaced at 200 KHz intervals and are within a pass band of approximately 200 KHz. Accordingly filter 124 for GSM has a bandwidth of approximately 200 KHz.

Mixer 122 selects the channel passed by filter 124 responsive to a channel select signal from synthesizer circuit 130. Each channel in the frequency band passed by filter 120 has a unique center frequency. The channel select signal input to mixer 122 from synthesizer circuit 130 is an oscillating signal which is combined with the signals from filter 120 to reduce, or step down, the frequency of signals output by filter 120. The amount that the signals are stepped down is determined by the frequency of the signal from synthesizer circuit 130. By varying the frequency of the channel select signal input to mixer 122, a different channel's center frequency is stepped down to be passed by filter 124. It is important that the frequency of the channel select signal be accurate so that the center frequency of the desired channel is stepped down to the center of frequency of filter 124 and all the information in this channel is passed to the detector 112.

The output of the filter 124 is input to mixer 126, which combines the filtered signal with another signal from synthesizer circuit 130. Mixer 126 steps down the intermediate frequency signal output by filter 124 to a base band frequency at which the detector 112 operates. It is important that mixer 126 reliably step down the information signal for detector 112 so that information is not lost by receiver circuit 108.

A reference oscillator 132 is used to generate a local reference signal. Synthesizer circuit 130 is connected to the reference oscillator 132 and to controller 114. The synthesizer is responsive to the local reference signal and a channel number from controller 114 to generate signals for mixers 122 and 126. The frequency spreading circuit 134 is also connected to the reference oscillator 132 and to controller 114. The frequency spreading circuit 134 is responsive to the local reference signal to generate a clock signal for controller 114 and to selectively spread the harmonics of this clock signal. Because the frequency spreading circuit and the synthesizer are connected to the same reference oscillator, both circuits can use a common crystal, thereby reducing the number of oscillators required for communication device 104. This achieves a cost and weight reduction for the device.

Controller 114 includes the digital circuitry within communication device 104. Controller 114 is comprised of circuitry which operates synchronously with master clock signals output by the frequency spreading circuit 134.

Figure 2:
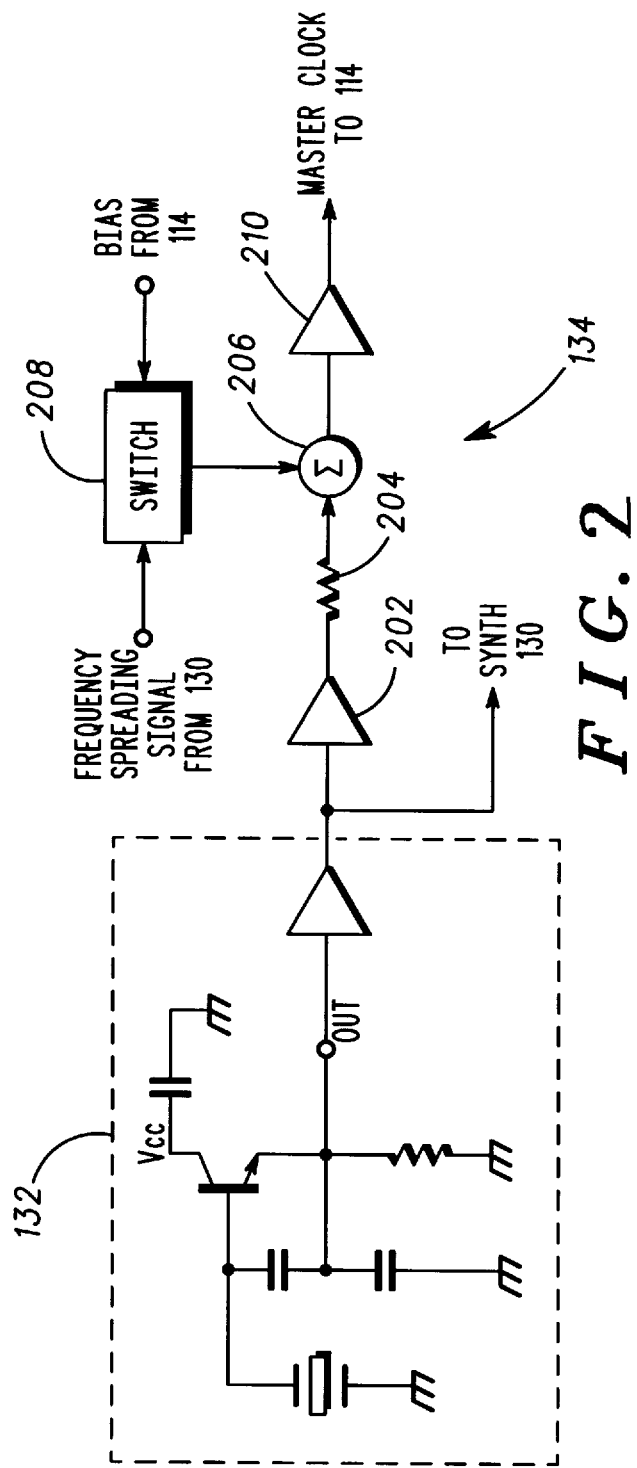
FIG. 2 is a circuit diagram illustrating a frequency spreading circuit.

The frequency spreading circuit 134 includes an input buffer 202 (FIG. 2), a summer 206, a switch circuit 208, and an output buffer 210. The input buffer 202 isolates the reference signal, or clock signal, input to synthesizer circuit 130, creating a buffered clock signal input to summer 206. The signal from input buffer 202 is illustrated connected to summer 206 through a resistor 204 which sets the level of the buffered clock signal input to the summer. A wire alone, a filter, or the like, can be used instead of the resistor.

The switch circuit 208 receives a frequency spreading signal from the synthesizer circuit 130 and a bias signal from controller 114. The bias signal turns switch circuit 208 "ON" and "OFF". When the switch circuit is ON, the frequency spreading signal is input to the summer 206 and summed with the buffered clock signal, the resultant signal passed to the output buffer 210. When switch circuit 208 is OFF, the buffered clock signal alone is passed into the output buffer 210. The output buffer 210 can be implemented using a comparator, a limit circuit, a logic inverter with its input DC biased at half its logic threshold (e.g., 2.5 volts for a 5 volt inverter), or the like.

When switch circuit 208 is ON, the output buffer 210 receives the summation signal and outputs a signal having phase modulation resulting from the addition of the frequency spreading signal added to the buffered clock signal. In this manner, the buffered clock signal is modulated by the frequency spreading signal to produce a modulated clock signal. When the switch circuit 208 is OFF, the output buffer 210 will not output a substantially modulated signal as the frequency spreading signal will not alter the buffered clock signal. The buffered clock signal is thus passed through the frequency spreading circuit without being modulated when the switch circuit 208 is OFF.

The level of the bias signal also adjusts the modulation index by changing the amplitude of the modulation signal. The switch circuit can be implemented using any suitable switch such as a relay, a field effect transistor (FET), an npn (negative-positive-negative) bipolar transistor, a pnp (positive-negative-positive) bipolar transistor, an optical switch including a light emitting diode (LED) and photo-sensitive element, or the like.

Figure 3:
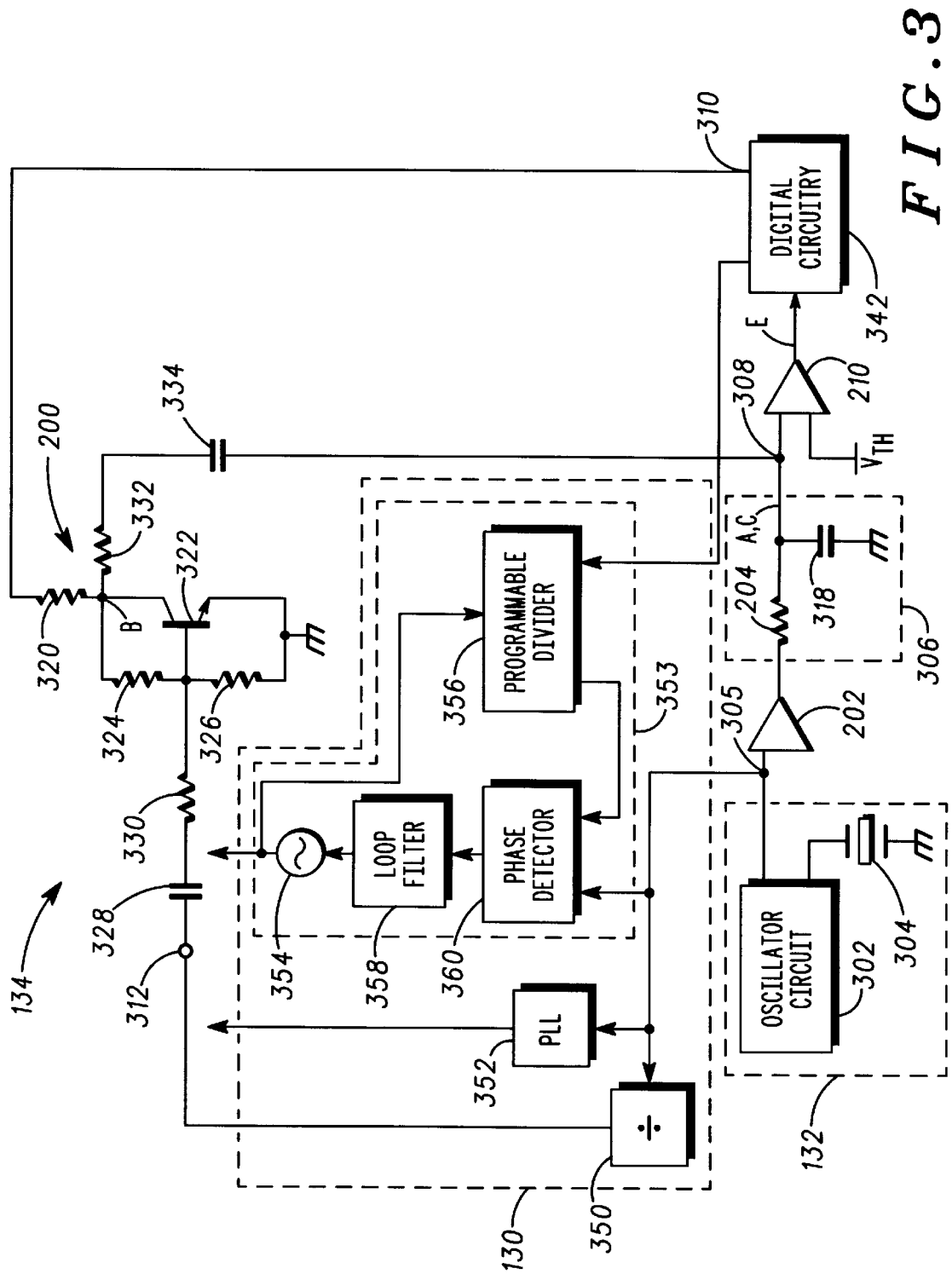
FIG. 3 is a circuit diagram illustrating a frequency spreading circuit for the circuit of FIG. 1.

An embodiment of the frequency spreading circuit 134 and synthesizer circuit 130 for a radiotelephone is illustrated in FIG. 3. The reference oscillator 132 is provided by an oscillator circuit 302 coupled to a crystal 304. The oscillator circuit 302 regulates the reference oscillator output such that the local reference signal, or clock signal, at junction 305 has a fixed predetermined frequency. The reference signal is input to a divider 350, a phase lock loop 352, and a phase lock loop 353, in synthesizer circuit 130. The divider 350 produces the frequency spreading signal input to the frequency spreading circuit 134 at input 312. The phase lock loop 352 generates the oscillating signal input to mixer 126. The phase lock loop 353 generates the channel select signal input to mixer 122.

The phase lock loop 353 includes a programmable divider 356 responsive to a channel signal from digital circuitry 342 to output a divided down signal according to the channel to be selected. A phase detector 360 compares the phase of the programmable divider to the reference signal from reference oscillator 132. The phase detector compares these signals and outputs a signal indicating the difference. The loop filter 358 filters this signal to produce a control signal for an oscillator 354. The oscillator frequency is set by the control input thereto from the filter 358. This signal is fed back to the programmable divider. The phase lock loop 353 will adjust the frequency of the controlled oscillator until the phase difference detected by the phase detector 360 is substantially zero. The phase lock loop 352 is similar to phase lock loop 353, except that phase lock loop 352 does not include a programmable divider receiving the channel signal.

The reference signal from oscillator circuit 302 is input to input buffer 202, the output of which is the buffered clock signal, being a square wave clock signal having a fixed predetermined frequency. The output of input buffer 202 is converted to a sinusoidal signal, A, by filter 306. Filter 306 comprises a resistor 204 and a capacitor 318. The resistor 204 sets the level of the buffered clock signal summed at the input of output buffer 210. If the master clock signal is a sinusoidal signal, the capacitor 318 can be omitted.

The bias signal at output 310 of digital circuitry 342 is connected to a resistor 320, which is connected to the collector of a transistor 322. The resistor is a load resistor for the amplifier circuit provided by transistor 322 and the associated components. The impedance of this resistor can be changed to change the gain of the amplifier. By selecting the gain of the amplifier, the amplitude of the frequency spreading modulation signal is set. The frequency spreading signal input 312 is connected via a series of elements, including capacitor 328 and resistor 330, to the base of a transistor 322. The capacitor 328 removes any DC (direct current) shift from this modulating signal. A resistor 324 is connected between the collector and the base of transistor 322, and a resistor 326 is connected between the base and the emitter of transistor 322. The collector of transistor 322 is connected to a resistor 332, which is connected via a capacitor 334 to a summing junction 308 at which point the voltages from switch circuit 208 and lowpass filter 306 are summed. The summing junction 308 is connected to output buffer 210 having a threshold level Vth. When the signal at summing junction 308 is greater than the threshold Vth, the output of output buffer 210 has a high logic level. When the signal at summing junction 308 is less than Vth, the output of output buffer 210 is a low logic signal. The Vth voltage level is normally chosen such that the duty cycle of the output signal from output buffer 210 is 50%. The resulting modulated clock signal is input to digital circuitry 342 as the clock signal at which the digital circuitry operates.

Figure 4:
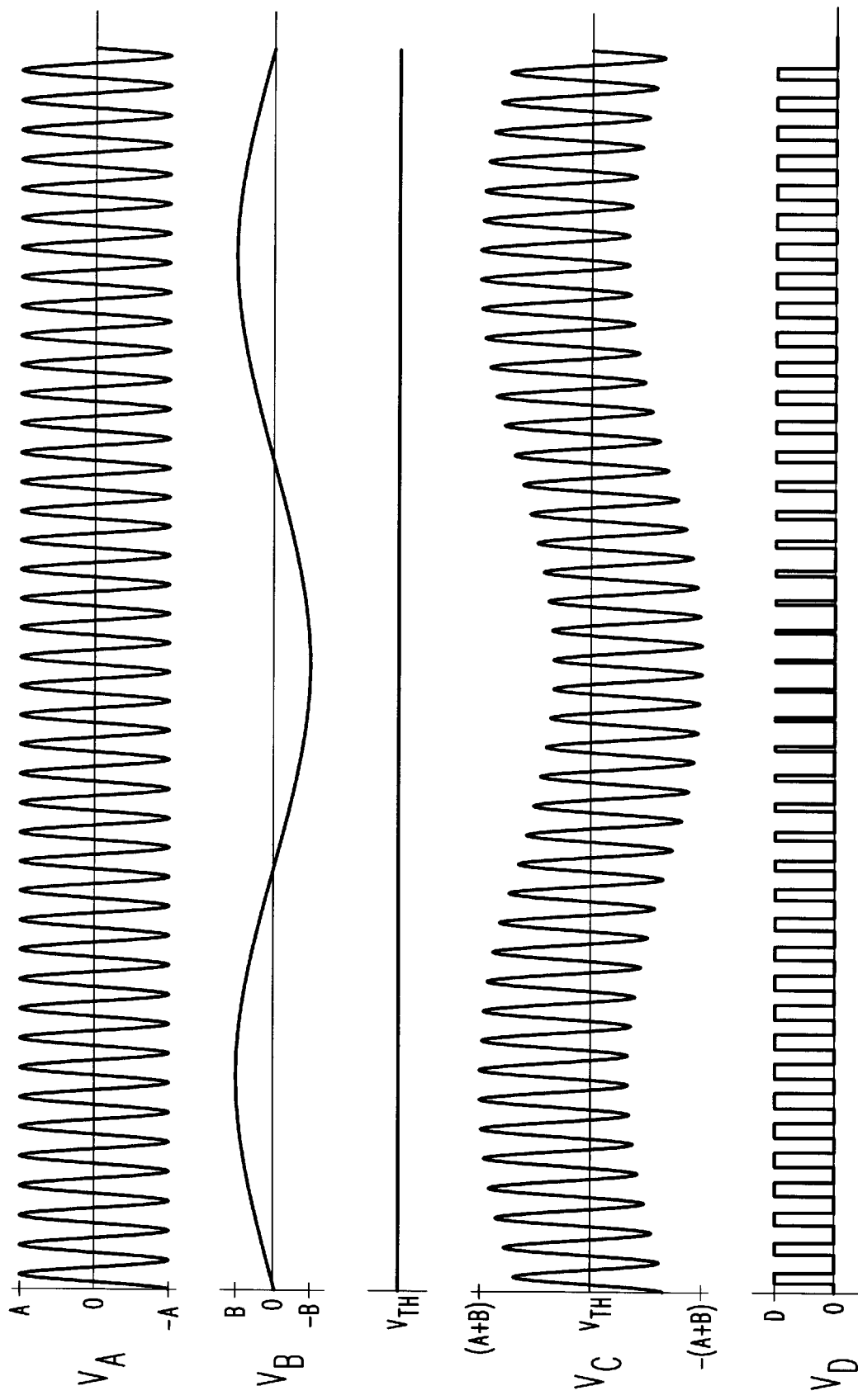
FIG. 4 illustrates signals in the circuit of FIG. 3.

In operation, and with reference to FIGS. 1, 3 and 4, the buffered clock signal output by input buffer 202 is filtered in filter 306, buffered a second time in output buffer 210, and passed to the digital circuitry 342 for most channels. The buffered clock signal is not modulated with the frequency spreading signal because the bias signal has a voltage level of 0, which prevents the switch circuit 208 from passing the frequency spreading signal to the junction 308. However, for those channels that include a harmonic of the master clock signal, a subset of all the channels, switch circuit 208 is turned ON by inputting a bias signal at output 310 that biases the transistor circuit into an amplifier. The frequency spreading signal at input 312 is then combined with the buffered clock signal at the input of the output buffer 210. As shown in FIG. 4, the buffered clock signal $V_A$ has a fixed frequency. The frequency spreading signal $V_B$ has a much lower frequency than the buffered clock signal. For example, buffered clock signal can be approximately 13 MHz and the frequency of the frequency spreading signal can be approximately 500 KHz, both signals derived from the reference oscillator 132. The combined signal $V_C$ is input to output buffer 210, having a fixed threshold Vth, when the switch circuit 208 is ON, whereas the oscillating master clock signal is input alone when the switch circuit is OFF.

The output signal $V_D$ of the output buffer 210 is the master clock signal for the digital circuitry 342. The master clock signal is a fixed frequency signal set by the buffered clock signal and the threshold voltage Vth when the switch circuit 208 is OFF. When the switch circuit 208 is ON, the master clock signal is a square wave signal that is a phase modulated signal at the buffered clock signal fundamental. This modulated clock signal produces wide band modulation at the harmonics because the amount of modulation is multiplied by the harmonic number. The average frequency of the phase modulated signal will be near the buffered clock signal frequency. The higher harmonics of the resultant master clock signal are spread out, such that they will not substantially interfere with the received signal in a single channel. It is envisioned that the amplitude of the modulating signal and the threshold signal are selected such that the pulse duty cycle of the resulting modulated clock signal varies from 45 to 55 percent when the switch circuit is on. If the duty cycle drops below 45 percent, the digital processor may have difficulty following the clock signal.

The modulation will now be described with reference to the waveforms $V_A$, $V_B$, $V_C$, Vth and $V_D$ in FIG. 4. Waveform $V_A$ is the buffered clock signal running at frequency $f_A$. Waveform $V_B$ is the frequency spreading signal, which is a sinusoidal signal running at frequency $f_B$. Waveform $V_C$ is the signal generated by summing $V_A$ and $V_B$. Vth is the cut-off amplitude of output buffer 210 (FIG. 3). Waveform $V_D$ is the modulated clock signal generated by passing waveform $V_C$ through a output buffer 210. As can be seen in FIG. 4, the variation in the amplitude of the first clock signal $V_A$ by summation with the frequency spreading signal causes a variation in phase, or phase modulation, in the modulated clock signal.

The voltage, $V_A$, of the first clock signal having a peak amplitude of A volts, a frequency of $f_A$, is described as follows as a function of time t:

$$V_A = A * \mathrm{Sin}\{(2\pi * f_A) * t\}$$

Similarly, the voltage $V_B$ of the frequency spreading signal has a peak amplitude of B volts and a frequency of $f_B$, is described as follows as a function of time t:

$$V_B = B * \mathrm{Sin}\{(2\pi * f_B) * t\}$$

The summation signal voltage $V_C$ is the summation of $V_A$ and $V_B$. The summation signal is described as follows:

$$V_C = A * \mathrm{Sin}\{(2\pi * f_A) * t\} + B * \mathrm{Sin}\{(2\pi * f_B) * t\}$$

If there is no modulation waveform present, such that the voltage of the frequency spreading signal $V_B$ is zero, the output buffer 210 output waveform $V_E$ is a square wave without any phase modulation, having a duty cycle of 50%. In this case, the comparator output amplitude D is described as follows:

$$V_D = (.5 * D) + (2 * D/\pi) * \sum_{n=1}^{\infty} \{\{1/[(2*n)-1]\} * \mathrm{Sin}\{[(2*n)-1] * (2*\pi*f_A)\}\}$$

With the frequency spreading signal having a non-zero value, modulation can be produced. However, the suppression of the amplitude of the harmonic must be achieved without causing too much phase distortion of the fundamental in modulated clock signal $V_D$. The distortion fundamental $\partial$ is the peak percentage deviation of the square wave duty cycle. The amplitude of the frequency spreading signal $V_B$ is selected such that the duty cycle of the modulated clock signal $V_D$ is within range of 50% $\pm\partial$. If $f_B$, the frequency of the frequency spreading signal, is significantly lower than $f_A$, the first clock signal frequency, then $V_B$ is determined as follows:

$$V_B = V_A * \mathrm{Sin}[0.5*(\partial/100)*\pi]$$

Typically, we need the peak percentage phase deviation, $\partial$, to be less than 5%. This gives a $V_B/V_A$ ratio requirement of 0.079 for $\partial=5\%$.

The modulated clock signal can be expressed as follows, where $J_m(x)$ denotes the mth order Bessel function of the first kind of x:

$$V_D = (.5 * D) + (2 * D/\pi) * \sum_{n=1}^{\infty} \left\{ \sum_{m=-\infty}^{\infty} \{1/[(2*n)-1]\} * \{J_m[n*.5*(\partial/100)]\} * \mathrm{Sin}\{[(2*n)-1] * (2*\pi*f_A) + m*(2*\pi*f_B)\} \right\}$$

For a small $\partial$, the amount of suppression of the nth clock harmonic is approximately equal to $10*\mathrm{Log}\{J_0[n*0.5*(\partial/100)]\}$. For example, if $\partial=5\%$ and $n=80$, then the suppression is $10\mathrm{Log}[J_0(2)]=6.5$ dB In a reduction to practice for GSM, the clock signal was approximately 13 MHz and the modulation signal approximately 500 KHz. This resulted in interference with the received signals in channels 5 and 70. These channels are at 936 and 949 MHz, respectively, which are the 72nd and 73 rd harmonics of the master clock signal. The circuit provided approximately 7 dB improvement in desensitization, which is a significant improvement over systems without frequency spreading. Additionally, this improvement was achieved at a very low additional cost relative to circuits without frequency spreading.

One difficulty of clock modulation techniques is spreading harmonics into other channels can cause a good channels to become desensitized. If this occurs, the switch circuit 208 can be provided. The switch circuit eliminates this problem by enabling frequency spreading only when the selected channel coincides with a harmonic of the master clock. In the reduction to practice noted above, the frequency spreading circuit is enabled by turning switch circuit 208 ON only for channels 5 and 70. If the switch circuit 208 is removed, the modulation clock signal at input 312 can be coupled through a resistor and a capacitor to output buffer 210, through a capacitor alone, or through transmission wires capacitively or inductively coupled.

In order to reduce the current drain by the switch circuit 208, which is desirable in battery powered devices to improve the operating time for a battery, additional criteria can be employed to determine when the switch circuit is turned ON. Thus, the switch circuit can be turned ON only when the selected channel coincides with a harmonic of the master clock and the receiver is operating near its sensitivity limit. This later condition may be determined from the bit error rate, or as an example in a GSM radiotelephone, from the RX_LEV or the RX_QUAL signals. The RX_QUAL signal is generated by the radiotelephone, and has a range from 0 to 4. RX_QUAL of: 0 is for a bit error rate between 0.0 and 0.2%; 1 is for a bit error rate between 0.2 and 0.4%; 2 is for a bit error rate between 0.4 and 0.8%; 3 is for a bit error rate between 0.8 and 1.6%; and 4 is for a bit error rate between 1.6 and 3.2%. The RX_LEV ranges form 0 to 100 and corresponds to the power of the receive signal including interference. The range of 0 to 100 corresponds to an input level of −110 to −10 dB. One criteria that can be used is that the frequency spreading circuit 134 is only used to modulate the buffered clock signal when RX_QUAL signal is greater than 1 and the selected channel is a harmonic of the first clock signal. Another criteria that can be used is that the frequency spreading circuit is only used to modulate the buffered clock signal when RX_QUAL is weak, such as below 15 for example, and the selected channel includes a harmonic of the buffered clock signal. In this manner, the switch circuit is only turned ON when the improvement in the signal level is necessary, thereby reducing the current drain by the switch circuit 208.

Thus it can be seen that a circuit is disclosed that provides effective frequency spreading. The circuit provides clock harmonic spreading in a circuit that is readily implemented using few circuit elements and at a lower cost than circuits heretofore utilized. Additionally, by selectively modulating the clock signal only in those channels that include a harmonic of the master clock signal, it is possible to avoid desense of good channels by frequency spreading.

We claim:

1. A communication device comprising:
   a receiver circuit receiving a modulated receive signal within a first bandwidth;
   a reference signal generator to generate a first clock signal at a first frequency, the first clock signal having harmonics;
   circuitry coupled to the reference signal generator and to the receiver circuit and being responsive to the first clock signal to produce a signal used by the receiver circuit to reduce a frequency of the modulated receive signal;
   a control circuit; and
   a frequency spreading circuit coupled between the reference signal generator and the control circuit to modulate the first clock signal with a frequency spreading signal to produce a modulated clock signal including modulated harmonic frequency components, wherein a power level of harmonic frequency components of the first clock signal are spread over a frequency bandwidth greater than the first bandwidth, whereby interference with the modulated receive signal within the first bandwidth is reduced;
   the control circuit coupled to the frequency spreading circuit to receive the modulated clock signal and operating at a frequency according to the modulated clock signal.

2. The communication device as defined in claim 1, further including a switch circuit coupled to the frequency spreading circuit to disable modulation with the frequency spreading signal.

3. The communication device as defined in claim 2, wherein the switch circuit receives a bias signal and a spreading modulation signal, the bias signal turning the switch circuit ON and OFF to selectively pass the spreading modulation signal.

4. The communication device as defined in claim 3, wherein the switch circuit includes a transistor biased by the bias signal, an amplitude of the bias signal being adjusted to adjust an amplitude of the frequency spreading signal output by the switch circuit.

5. The communication device as defined in claim 3, wherein the control circuit is coupled to the switch circuit to provide the bias signal and is coupled to the circuitry to control the receiver circuit to select a channel from a group of possible channels, and wherein the bias signal is selected to disable the switch circuit such that the first clock signal is modulated with the frequency spreading modulation signal only for a predetermined subset of the group of possible channels.

6. The communication device as defined in claim 2, wherein the frequency spreading circuit includes a summer coupled to the switch circuit and to the reference signal generator for combining an output of the switch circuit with the first clock signal.

7. The communication device as defined in claim 1, wherein the frequency spreading signal is a substantially constant frequency signal having a frequency substantially less than the frequency of the first clock signal.

8. A communication device comprising:
- a receiver circuit receiving a modulated receive signal within a first bandwidth;
- a reference signal generator to generate a first clock signal at a first frequency, the first clock signal having harmonics;
- a frequency spreading circuit coupled to the reference signal generator to modulate the first clock signal with a frequency spreading signal to produce a modulated clock signal including modulated harmonic frequency components, the frequency spreading circuit selectively modulating the frequency spreading signal and the first clock signal, wherein power of harmonic frequency components are spread over a frequency bandwidth greater than the first bandwidth when the frequency spreading signal is modulated with the first clock signal whereby interference of the harmonics with the modulated receive signal within the first bandwidth is reduced; and
- a control circuit coupled to the frequency spreading circuit to receive the modulated clock signal and operating at a frequency according to the modulated clock signal, the control circuit controlling the frequency spreading circuit to modulate the first clock signal with the frequency spreading signal when the modulated receive signal has a frequency near a harmonic of the first clock signal and controlling the frequency spreading circuit to not modulate the first clock signal with the frequency spreading signal when the modulated receive signal has a frequency substantially different from a harmonic of the first clock signal.

9. The communication device as defined in claim 8, wherein the frequency spreading circuit includes a switch circuit having a bias control input and an input coupled to receive the frequency spreading signal.

10. The communication device as defined in claim 9, wherein the switch circuit includes a transistor biased by a bias signal, an amplitude of the bias signal being adjusted to adjust a duty cycle of the modulated clock signal.

11. The communication device as defined in claim 10, wherein the control circuit is coupled to the switch circuit to provide the bias signal and is coupled to the receiver circuit to control the receiver circuit to select a channel from a group of possible channels, and wherein the bias signal controls the switch circuit to pass the frequency spreading signal only for a subset of the group of possible channels.

12. The communication device as defined in claim 9, wherein the frequency spreading circuit includes a summer coupled to the switch circuit and to the reference signal generator for combining an output signal from the switch circuit with the first clock signal.

13. The communication device as defined in claim 8, wherein the frequency spreading signal is a substantially constant frequency signal having a frequency substantially less than the frequency of the first clock signal.

14. The communication device as defined in claim 8, wherein the control circuit receives an output of the receiver circuit and controls the frequency spreading circuit to modulate the first clock signal with the frequency spreading signal only when the receiver circuit is near its sensitivity limit, and a harmonic of the first clock signal is near a frequency of the modulated receive signal.

15. A radiotelephone comprising:
- a mixer for combining a received signal with a channel select signal to step down the received signal within a particular channel to an intermediate frequency band;
- a filter coupled to the mixer for receiving a stepped down signal from the mixer and passing signals in the intermediate frequency band;
- a reference signal generator for generating a first clock signal;
- a synthesizer coupled to the reference signal generator for receiving the first clock signal and receiving a channel signal, the synthesizer generating the channel select signal;
- a control circuit; and
- a frequency spreading circuit coupled between the reference signal generator and the control circuit to modulate the first clock signal with a frequency spreading signal to produce a modulated clock signal including modulated harmonic frequency components, wherein power of harmonic frequency components are spread over a frequency bandwidth greater than a bandwidth passed by the filter whereby interference with the received signal within the bandwidth of the filter is reduced;
- the control circuit to receive the modulated clock signal and operating at a frequency according to the modulated clock signal, the control circuit generating the channel signal.

* * * * *